(12) United States Patent
Sako et al.

(10) Patent No.: US 7,398,251 B2
(45) Date of Patent: *Jul. 8, 2008

(54) METHOD AND APPARATUS FOR TRANSMITTING AND RECEIVING A DECODING KEY ENCODED WITH SPECIFIC INFORMATION TO DECODE ENCRYPTED INFORMATION OF A RECORD MEDIUM

(75) Inventors: Yoichiro Sako, Chiba (JP); Akira Kurihara, Kanagawa (JP); Yoshitomo Osawa, Kanagawa (JP); Isao Kawashima, Kanagawa (JP); Hideo Owa, Kanagawa (JP)

(73) Assignee: Sony Corporation, Tokyo (JP)

( * ) Notice: Subject to any disclaimer, the term of this patent is extended or adjusted under 35 U.S.C. 154(b) by 375 days.

This patent is subject to a terminal disclaimer.

(21) Appl. No.: 11/087,128

(22) Filed: Mar. 23, 2005

(65) Prior Publication Data
US 2005/0165701 A1 Jul. 28, 2005

Related U.S. Application Data

(63) Continuation of application No. 09/789,405, filed on Feb. 20, 2001, now Pat. No. 6,882,987, which is a continuation of application No. 08/904,924, filed on Aug. 1, 1997, now Pat. No. 6,215,745, which is a continuation of application No. 08/671,347, filed on Jun. 27, 1996, now Pat. No. 6,134,201.

(30) Foreign Application Priority Data

Jun. 30, 1995 (JP) ................................. 07-166644
Aug. 11, 1995 (JP) ................................. 07-206085

(51) Int. Cl.
*G06Q 99/00* (2006.01)

(52) U.S. Cl. ......................................... 705/57; 713/150

(58) Field of Classification Search ................... 405/57, 405/58, 51, 50; 713/150, 182
See application file for complete search history.

(56) References Cited

U.S. PATENT DOCUMENTS 4,658,093 A 4/1987 Hellman (Continued)

FOREIGN PATENT DOCUMENTS

EP 0 191 162 8/1986

(Continued)

OTHER PUBLICATIONS

Schneier, Bruce, Applied Cryptography (second edition). © 1996 by Bruce Schneier. Published by John Wily and Sons, Inc. pp. 170-174.

*Primary Examiner*—Pierre Eddy Elisca
(74) *Attorney, Agent, or Firm*—Frommer Lawrence & Haug LLP; William S. Frommer; Thomas F. Presson

(57) ABSTRACT

A data recording apparatus capable of preventing easily copying of information is disclosed with which, even if information is copied, the copied information cannot be reproduced, the data recording apparatus having a terminal to which encoder ID specific for the data recording apparatus is input, a recording unit for recording at least the encoder ID on an optical disk, and an encoding circuit for, in accordance with the encoder ID, encoding data supplied through a terminal and required to be recorded so that encoded data is, together with the encoder ID, recorded on the optical disk.

1 Claim, 12 Drawing Sheets

U.S. PATENT DOCUMENTS

| | | |
|---|---|---|
| 4,700,387 A | 10/1987 | Hirata |
| 4,816,928 A | 3/1989 | Sasaki et al. |
| 5,010,571 A | 4/1991 | Katznelson |
| 5,113,518 A | 5/1992 | Durst et al. |
| 5,224,166 A * | 6/1993 | Hartman, Jr. ................ 713/190 |
| 5,247,575 A | 9/1993 | Sprague et al. |
| 5,337,357 A * | 8/1994 | Chou et al. ................... 705/56 |
| 5,392,351 A | 2/1995 | Hasebe et al. |
| 5,400,319 A | 3/1995 | Fite et al. |
| 5,400,403 A | 3/1995 | Fahn et al. |
| 5,570,339 A | 10/1996 | Nagano |
| 5,606,539 A | 2/1997 | De Haan et al. |
| 5,617,219 A | 4/1997 | Oikawa |
| 5,666,411 A | 9/1997 | McCarty |
| 5,892,900 A | 4/1999 | Ginter et al. |

FOREIGN PATENT DOCUMENTS

| | | |
|---|---|---|
| EP | 0 191 162 A2 | 8/1986 |
| EP | 0 297 242 A2 | 1/1989 |
| EP | 0 302 710 A2 | 2/1989 |
| EP | 0 297 242 | 4/1989 |
| EP | 0 593 305 A2 | 4/1994 |
| EP | 0 636 962 | 2/1995 |
| EP | 0 653 695 | 5/1995 |
| JP | 07-123394 | 5/1995 |
| JP | 409115241 A * | 5/1997 |
| JP | 02004304575 A * | 10/2004 |

* cited by examiner

METHOD AND APPARATUS FOR TRANSMITTING AND RECEIVING A DECODING KEY ENCODED WITH SPECIFIC INFORMATION TO DECODE ENCRYPTED INFORMATION OF A RECORD MEDIUM

This application is a continuation of U.S. patent application Ser. No. 09/789,405 filed Feb. 20, 2001 now U.S. Pat. No. 6,882,987, which is a continuation of U.S. patent application Ser. No. 08/904,924 filed Aug. 1, 1997 now U.S. Pat. No. 6,215,745, which is a continuation of Ser. No. 08/671,347 filed Jun. 27, 1996, now U.S. Pat. No. 6,134,201.

BACKGROUND OF THE INVENTION

1. Field of the Invention

The present invention relates to a data recording apparatus for recording data on a record (recording, recordable or recorded) medium, a method therefor, a data reproducing apparatus for reproducing data recorded on a record medium, a method therefor and a record medium on which data has been recorded. More particularly, the present invention relates to an information providing/collecting apparatus for providing and collecting so-called multimedia information, such as video information and music information, or program information and a method therefor.

2. Related Background Art

As a data record medium on which information signals, such as Audio data, video data and various data items, are recorded, means for optically recording information signals, specifically, a so-called compact disk (CD) for use in the music field and a CD-ROM which meets the CD standard and which is used for data have been used all over the world in recent years.

Hitherto, information providing service has been realized as a so-called data base system and a personal computer communication system in each of which a user terminal (a terminal of an information collecting side) and an information provider are connected to each other through, for example, the telephone line to enable information required by the user to be taken out. Another information providing service has been realized with which a large-capacity medium, such as a so-called CD-ROM having encoded information recorded thereon is distributed and key information for decoding encoded information is transmitted to the user by, for example, communication so that encoded information recorded on the CD-ROM is decoded and decoded information is copied on a hard disk or the like so as to be used.

Moreover, a technique has been disclosed in Japanese Patent Publication No. 2-60007 in which a password formed by encoding a file key by using a code key is supplied to a computer; and a program written on the record medium is decoded by a coding mechanism to prevent copying and sharing of the software program.

Hitherto, all of information items recorded on the foregoing CD or the CD-ROM are read by a reproducing apparatus and copied onto, for example, a hard disk. Then, data copied onto the hard disk is supplied to an encoder system for the CD or the CD-ROM to newly make a CD or a CD-ROM so that a pirate edition is easily manufactured. As described above, the security function, such as the copy protection, has been unsatisfactory.

The foregoing problem is also critical for a so-called digital video disk (DVD), which is expected to be a data record medium for a next generation.

On the other hand, in the conventional information providing service, a method has been employed in which key information for decoding is transmitted to a user in such a manner that key information is transmitted by means of voice through a telephone line. Thus, key information has not been encoded particularly. However, the foregoing method has a risk in view of keeping security.

In the case where communication is employed to transmit key information, one-to-one connection is usually established. Therefore, there is substantially no risk of key information being stolen. However, in the case where key information is transmitted through a network, there arises a problem in protecting key information.

Therefore, in an information providing system, in which mediums, on each of which encoded information has been recorded in a large quantity, are distributed by the information provider; and only in a case where a user requires information to obtain from the medium, key information for decoding the code is supplied and accounting is performed, the problem in view of security when key information is transmitted results in a risk to arise in that key information can be obtained by a person except the subject user. In the foregoing case, the information providing system cannot be held. If whether or not the user is a formal user cannot be specified, there is a risk that account is put down to another person. Also in the foregoing case, the information providing system cannot be held.

Thus, security improvement in transmitting key information from an information provider to a user and reliable specification of a user are important requirements.

SUMMARY OF THE INVENTION

In view of the foregoing, an object of the present invention is to provide a data recording apparatus, a method therefor, a data reproducing apparatus, a method therefor and a record (recording, recordable or recorded) medium with which easy copying can be prevented and reproduction of copied data can be inhibited.

Another object of the present invention is to provide an information providing/collecting apparatus and method therefor capable of improving security in transmitting key information from an information provider to a user and reliably specifying a user.

The data recording apparatus and method according to the present invention are data recording apparatus and method of recording data on a record medium such that specific identification information is supplied to record at least the identification information so that the foregoing problems are solved. The identification information is exemplified by identification information specific to the data recording apparatus.

The record medium according to the present invention is a record medium on which data is recorded by the data recording apparatus such that at least identification information specific to the data recording apparatus is recorded so that the foregoing problems are solved.

The data reproducing apparatus and method according to the present invention are data reproducing apparatus and method of reproducing data from a record medium, on which at least identification information specific to the data recording apparatus is recorded together with recorded data. Data is read from the record medium, the identification information is extracted from data read from the record medium, and reproduction of data from the record medium is interrupted if identification information cannot be extracted. Thus, the foregoing problems can be solved.

The data reproducing apparatus and method according to the present invention are data reproducing apparatus and method for reproducing data from a record medium, on which at least identification information specific to the data recording apparatus is recorded together with recorded data. Data is read from the record medium, the identification information is extracted from data read from the record medium, and recorded data, which has been encoded in accordance with the identification information, is decoded in accordance with the extracted identification information so that the foregoing problems are solved.

As a result of the foregoing structure, identification information specific to the data recording apparatus is recorded on the record medium so that confirmation of identification information enables the process hysteresis of the record medium to be detected. If identification information does not exist, reproduction of data from the record medium is interrupted. Thus, copying of data from the record medium can be prevented.

The information providing/collecting apparatus and method according to the present invention have the structure such that an information medium having information encoded on an information collection side is distributed from an information providing side; the information providing side and the information collection side are connected to each other through information transmission means; information is transmitted and received between the information providing side and the information collection side through the information transmission means; the information providing side uses at least one specific information of the information collection side to encode key information required to decode encoded information of the information medium; the information collection side uses encoded key information transmitted from the information providing side to decode the key information; and the information collection side uses encoded information read from the information medium to decode the encoded information by using the decoded key information. Thus, the foregoing problems can be solved.

When information is read from the record medium having encoded information, key information for decoding the code is required in the present invention. Key information is possessed by the information providing side, and the information collecting side requires supply of key information. At this time, the information collecting side which receives key information transmits specific information for specifying the information collecting side to the information providing side. The information providing side specifies the information collecting side in accordance with the specific information and performs an accounting process. Simultaneously, specific information is used to encode key information for decoding the code so as to be transmitted. Thus, the security performance in transmitting key information is intended to be improved. The information collecting side decodes the received and encoded key information in accordance with the specific information to take out key information for decoding information. By using key information, encoded information of the record medium is decoded.

Other objects, features and advantages of the invention will be evident from the following detailed description of the preferred embodiments described in conjunction with the attached drawings.

DESCRIPTION OF THE PREFERRED EMBODIMENTS

Preferred embodiments of the present invention will now be described with reference to the drawings.

Figure 1:
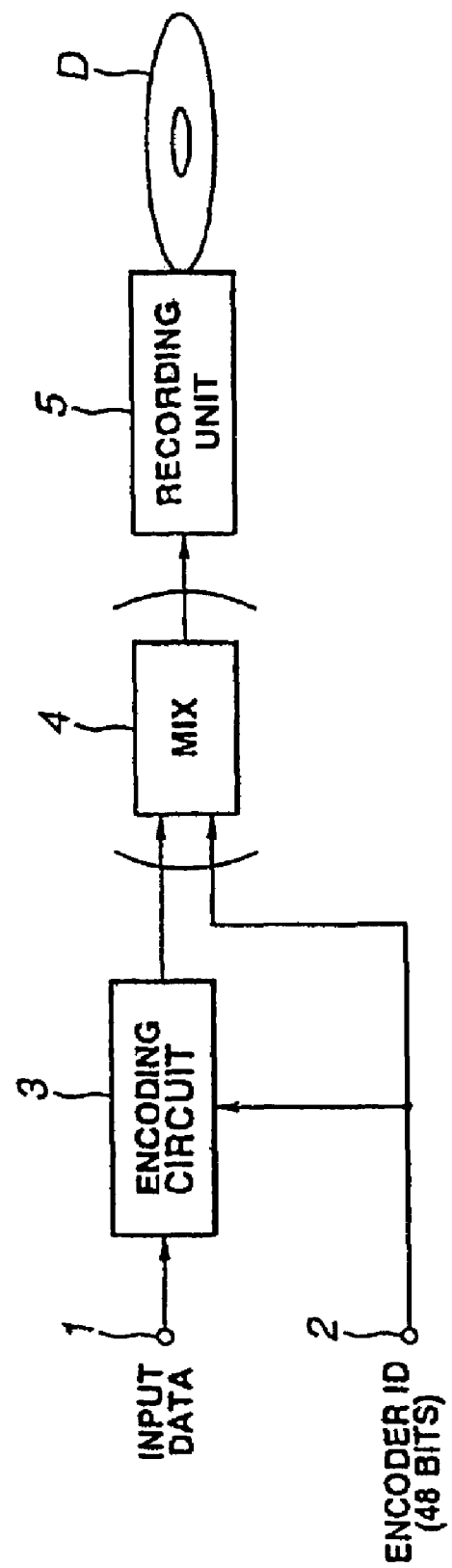
FIG. 1 is a block diagram showing the basic structure of a data recording apparatus according to an embodiment of the present invention.
Figure 2:
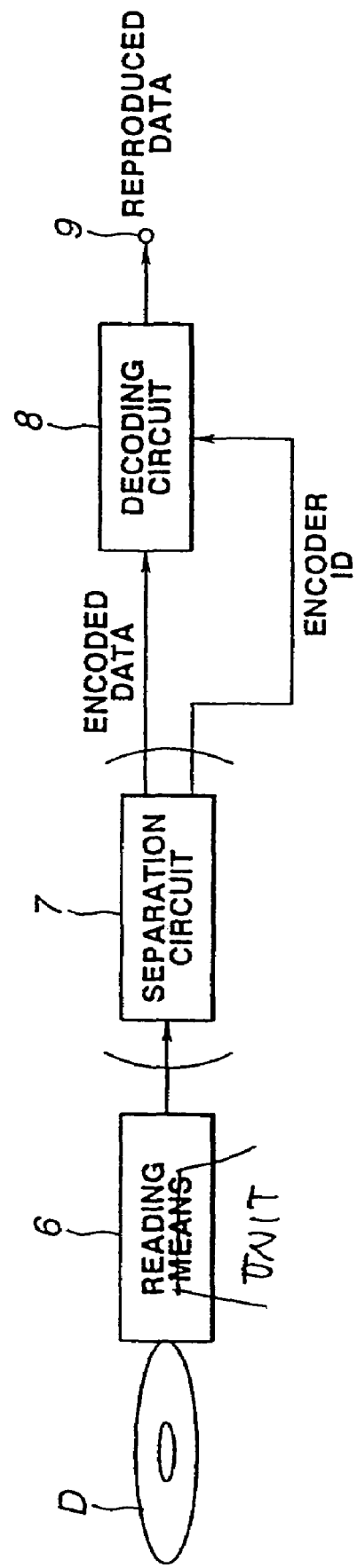
FIG. 2 is a block diagram showing the basic structure of a data reproducing apparatus according to an embodiment of the present invention.

As shown in FIG. 1, a data recording apparatus for embodying a data recording method according to the present invention has a basic structure including a terminal 2, to which identification information (hereinafter called an "encoder ID") specific for the data recording apparatus is supplied, and a recording means 5 for recording at least the encoder ID on an optical disk D.

The data recording apparatus according to this embodiment further includes an encoding circuit 3 for, in accordance with the encoder ID, encoding data supplied through a terminal 1 and required to be recorded so as to, on the optical disk D, record data (hereinafter called "encoded data"), encoded by the encoding circuit 3, together with the encoder ID.

The encoder ID can be recorded on a predetermined region of the optical disk D, for example, a TOC (table of contents) area, a header region or the like. As an alternative to this, a mixing circuit 4 may be disposed, for example, in front of a recording UNIT 5 of the data recording apparatus according to this embodiment to mix the encoder ID in a data row of encoded data in the mixing circuit 4 to record the encoder ID on a data recording region of the optical disk D in which the encoded data must be recorded. As a matter of course, if data, to be recorded, is not encoded, the encoder ID may be, in the mixing circuit 4, mixed with the data row of data to be recorded so as to be recorded on the optical disk D.

By recording the encoder ID on the optical disk D as described above, the hysteresis of the data recording apparatus can be left in the optical disk D. That is, if the specific hysteresis of the data recording apparatus can be left, confirmation of the encoder ID of a disk processed unlawfully enables an apparatus which has processed the disk to be detected. If a fact that the hysteresis can be detected is informed widely, an intention of copying a disk is refrained so that unlawful copying is previously prevented.

On the other hand, a data reproducing apparatus, to which the data reproducing method according to the present invention is applied, reproduces data from the optical disk D, on which at least the encoder ID is, together with data, recorded by the data recording apparatus according to the present invention. The data reproducing apparatus includes a data reading UNIT 6 for reading data from the optical disk D; and a separation circuit 7 for extracting the encoder ID from data read from the optical disk D.

However, in the case where the encoder ID has been recorded on the foregoing predetermined region of the optical disk D, the data reading UNIT 6 acts as means for extracting the encoder ID such that the data reading UNIT 6 reads the encoder ID from the foregoing predetermined region individually from recorded data. Therefore, the separation circuit 7 is not required in the foregoing case. In the case where the encoder ID is mixed with the data row of recorded data, the data reading means 6 reads both recorded data and the encoder ID from the data region of the optical disk D. Therefore, in the foregoing case, the separation circuit 7 extracts the encoder ID from the data row of recorded data.

The recorded data and encoder ID are transferred to a decoding circuit 8. When the encoder ID has been supplied, recorded data is, as reproduced data, transmitted from a terminal 9 of the decoding circuit 8. When the encoder ID has not been supplied (when the encoder ID has not been certified), reproduction (decoding) of recorded data is interrupted.

If data recorded on the optical disk D together with the encoder ID is encoded data, encoded data read from the optical disk D is decoded in accordance with the encoder ID read from the optical disk D. That is, the foregoing fact means that even if only recorded data can be copied, encoded data cannot be decoded. The thus-decoded data is taken out as reproduced data from the terminal 9.

As described above, with the data reproducing apparatus according to this embodiment, even if recorded data can be copied, certification of the encoder ID is required to obtain reproduced data. Thus, the security can be improved.

Figure 3:
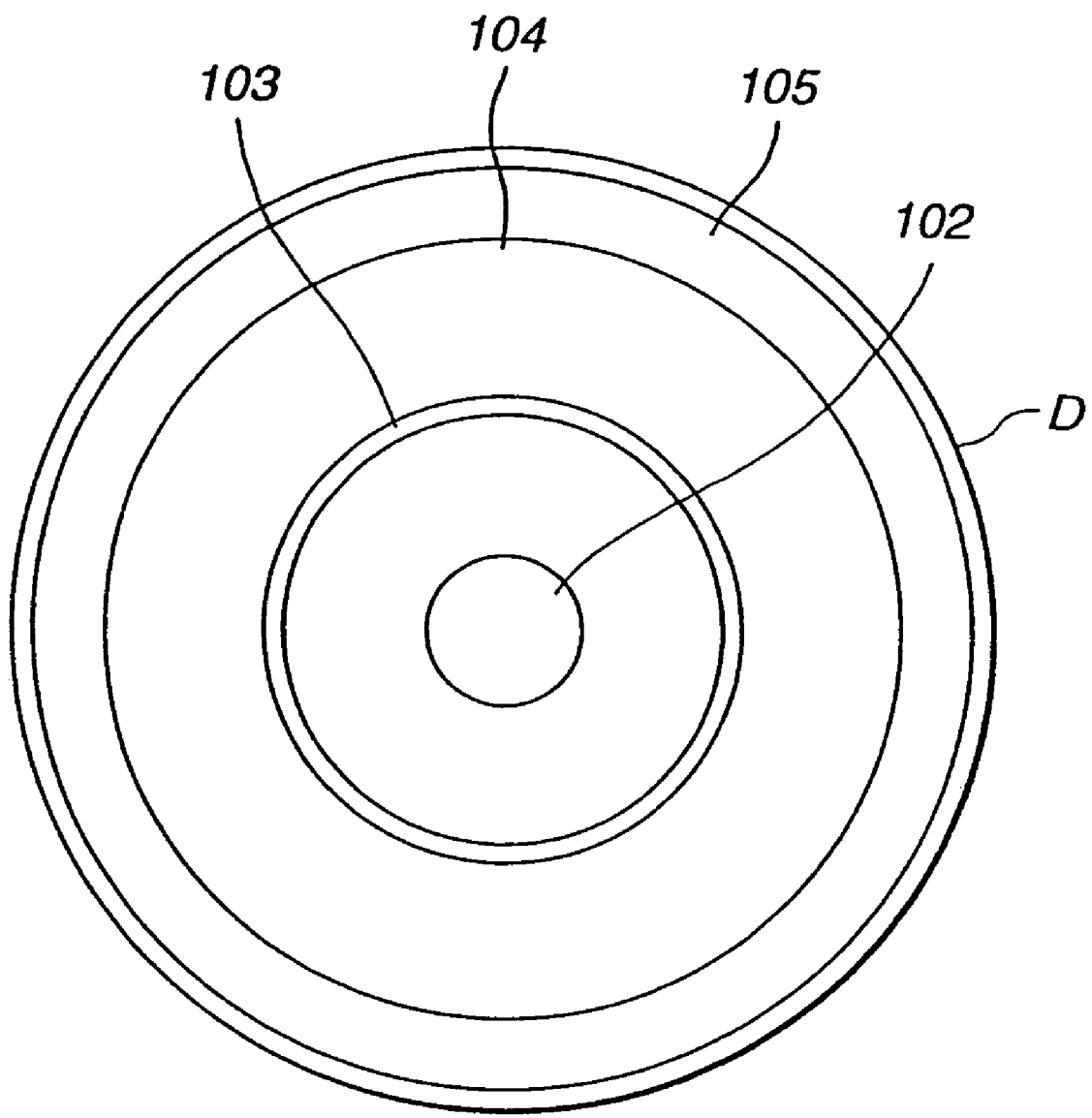
FIG. 3 shows the basic structure of an optical disk according to an embodiment of the present invention.

For example, as shown in FIG. 3, the optical disk D has a central opening 102 in the central portion thereof. Moreover, in a direction from the inner portion of the optical disk D toward the outer periphery of the same, there are formed a lead-in region 103 for use as a TOC (table of contents) serving as a program control region; a data region 104 on which data is recorded; and a so-called lead-out region 105 serving as a data end region. In the case where the encoder ID is recorded on a predetermined region different from the region in which data is recorded, the encoder ID is recorded on a region, for example, the lead-in region 103, except the data region 104.

The data recording apparatus according to this embodiment may be, for example, an encoder for adding an error correction code to audio data, video data or a program data and modulating the same, a formatter, a so-called cutting apparatus, a mastering apparatus or a stamping apparatus. The foregoing encoder ID is identification information specific for the foregoing apparatus. In a case where the optical disk D is a magneto-optic (MO) disk or a recordable CD (a so-called CD-R), the encoder ID serves as identification information specific for the apparatus for reproducing the foregoing disk.

Figure 4:
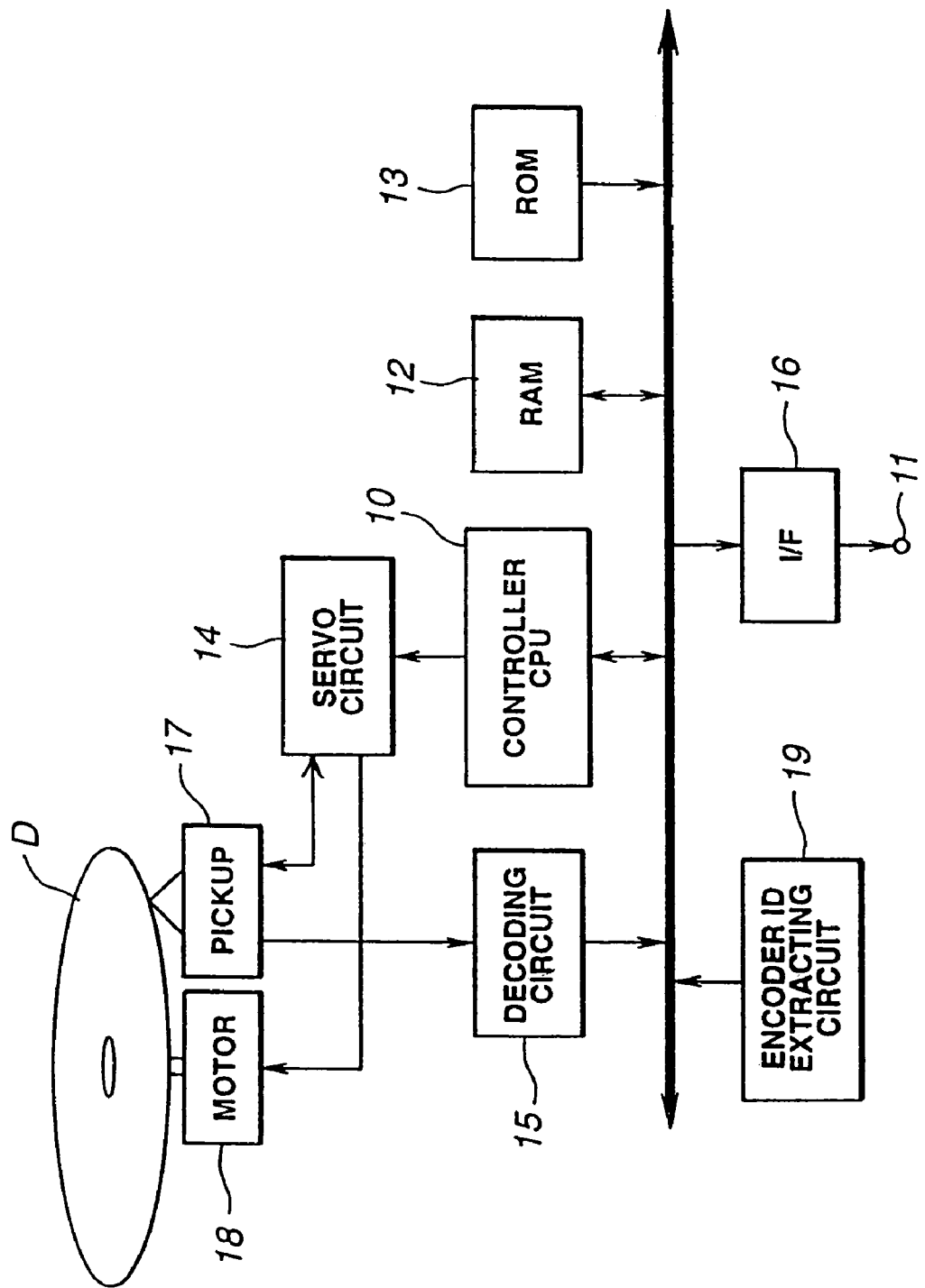
FIG. 4 is a block diagram showing the specific structure of a data reproducing apparatus for reproducing optical disk according to an embodiment of the present invention.

Then, the schematic structure of the data reproducing apparatus for reproducing the foregoing optical disk D will now be described with reference to FIG. 4. Referring to FIG. 4, description will be performed about an operation to be performed in a case where data to be recorded has been encoded in accordance with the encoder ID and the encoder ID has been recorded while being mixed with a data row of encoded data.

Referring to FIG. 4, an optical pickup 17 converges laser beams onto the optical disk D and receives reflected laser beams so as to read a data signal recorded on the optical disk D and supply the data signal to a decoding circuit 15. The optical pickup 17 supplies a focus servo error signal and a tracking error signal produced on the basis of reflected laser beams to a servo circuit 14.

The servo circuit 14 produces a focus servo signal and a tracking servo signal corresponding to the focus servo error signal and the tracking error signal under control of a controller CPU 10 to supply the signals to the optical pickup 17. The servo circuit 14 as well as transmits a rotation servo signal of the optical disk D so that rotations of a motor 18 are controlled in accordance with the rotation servo signal.

On the other hand, the decoding circuit 15 performs operations of demodulating and correcting an error of the data signal supplied from the optical pickup 17.

The data items read from the data recording region 104 of the optical disk D and decoded by the decoding circuit 15 are, in sector units, initially supplied to an encoder ID extracting circuit 19. The encoder ID extracting circuit 19 extracts data of the encoder ID from data items in sector units. Extracted data of the encoder ID is stored in a working RAM 12 which is controlled by a controller CPU 10.

The controller CPU 10 uses data of the encoder ID stored in the working RAM 12 to decode a portion of encoded data left from extraction of data of the encoder ID. Note that program data, which is used by the controller CPU 10, is stored in a program ROM 13.

The thus-decoded reproduced data is, through an interface circuit 16, transmitted to the outside from an output terminal 11.

Figure 5:
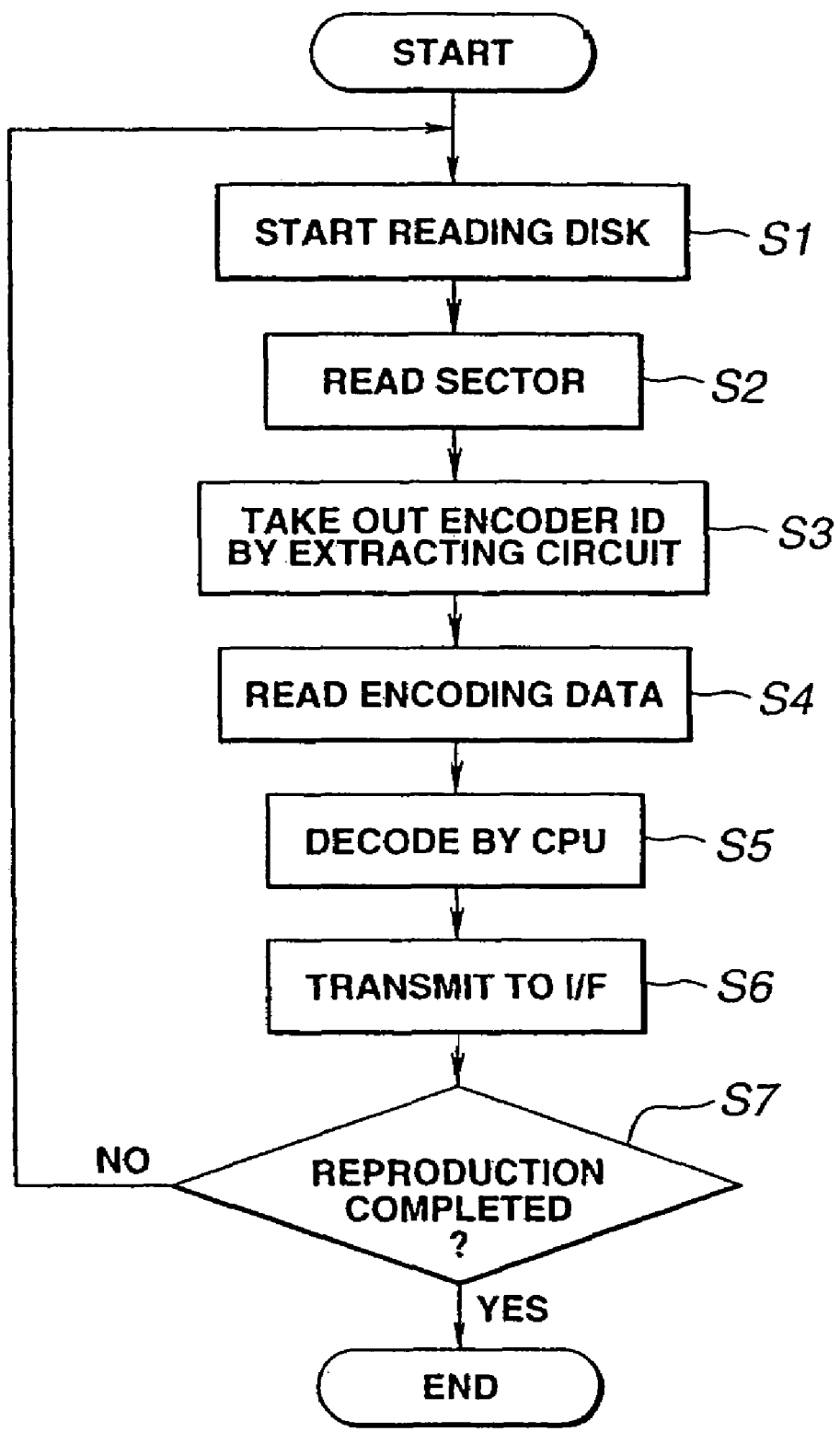
FIG. 5 is a flow chart of the operation for reproducing data from the optical disk according to the embodiment of the present invention.
Figure 6:
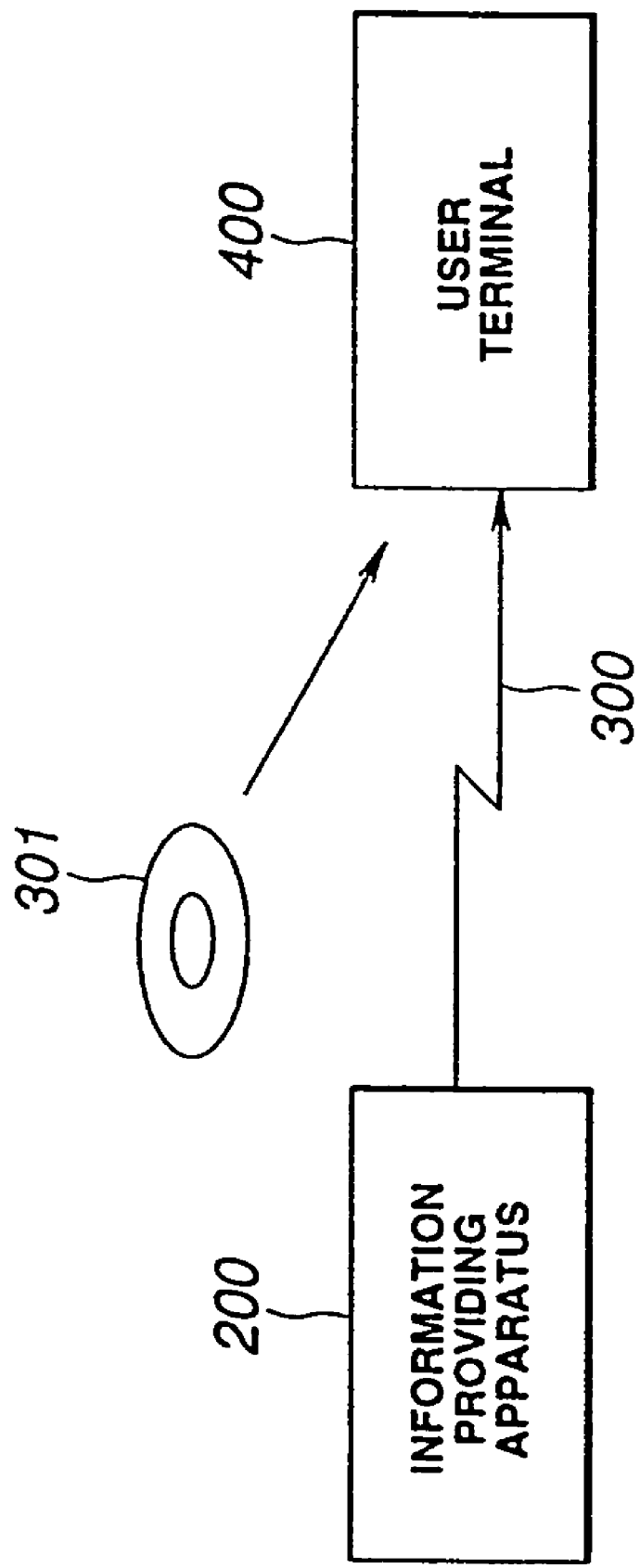
FIG. 6 is a circuit diagram showing an example of the structure of an information providing system according to the present invention.

The flow of the operation to be performed by the data reproducing apparatus shown in FIG. 4 is as shown in FIG. 5.

Referring to FIG. 5, when an operation of reading the optical disk D has been commenced in step S1, data is read from the optical disk D from each sector.

In step S3 data of the encoder ID is extracted from data for each sector by the encoder ID extracting circuit 19.

In step S4 encoded data left from extraction of data of the encoder ID is read. In step S5 the controller CPU 10 decodes encoded data in accordance with the encoder ID.

In step S6 decoded data is, as reproduced data, supplied to the interface circuit 16.

In step S7 whether or not reproduction of the optical disk D has been completed is determined. If the reproduction has not been completed, the operation returns to step S1 so that the foregoing process is performed. If the reproduction has been completed, the process is ended here.

An information providing and/or collecting method according to the present invention will now be described with reference to the drawings.

As the information providing/collecting apparatus to which the information providing/collecting method according to the present invention is applied, that is, as the information providing system, an assumption is performed that a user terminal 400 for collecting information and an information providing apparatus 200 for providing information are connected to each other through a communication network 300, such as a telephone line or a local area network (LAN) serving as information transmitting means.

Figure 7:
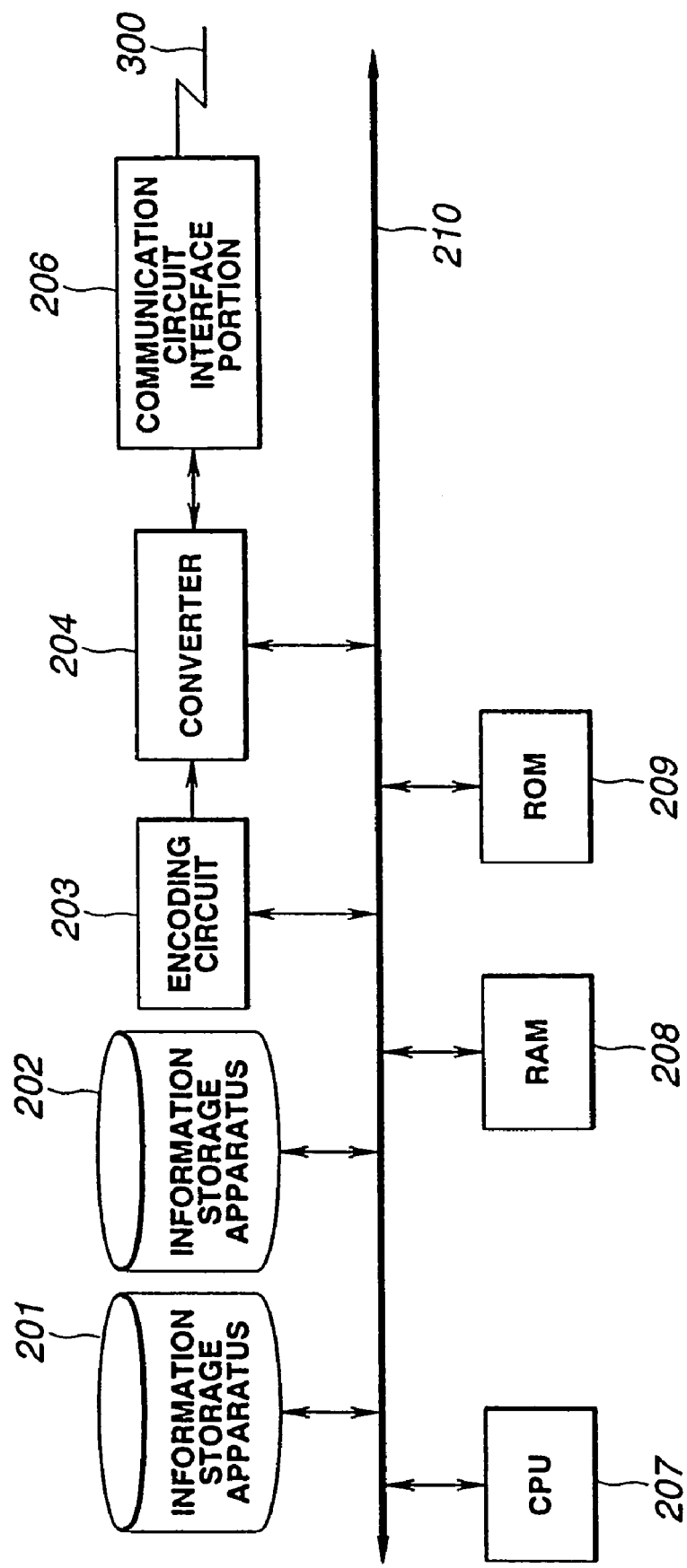
FIG. 7 is a circuit diagram showing an example of the structure of an information providing apparatus of the information providing system.

The information providing apparatus 200 of the information providing system, as shown in FIG. 7, includes an information storage apparatus 201 for storing information to be transmitted to the user side and key information for encoding information to be transmitted; an information storage apparatus 202 for storing accounting information for each user, and information of telephone numbers of the users and specific numbers of the users; an encoding circuit 203 for encoding information to be transmitted in accordance with key information; a converter 204 for converting information to be transmitted in such a manner that the information can be transmitted; a communication line interface portion 206 for transmitting information to the communication network (communication line) 300; a ROM 209 for storing a program for controlling the information providing apparatus 200 and information about the structure of the system; a CPU 207 for executing the foregoing control program; a RAM 208 for storing temporary operation information; and a system bus 210 for the CPU 207 consisting of a data bus, an address bus, a control bus and the like.

Figure 8:
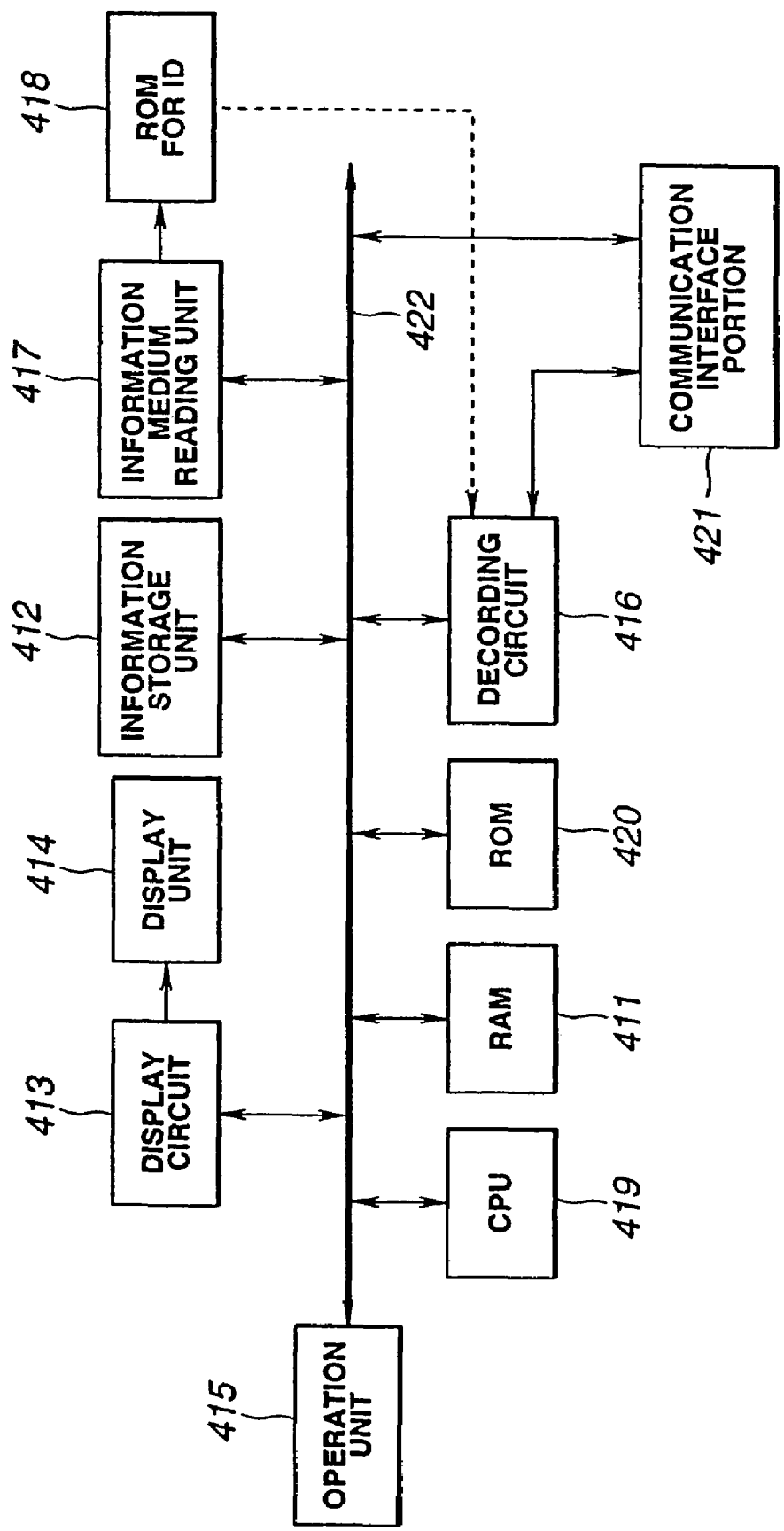
FIG. 8 is a circuit diagram showing an example of the structure of a user terminal of the information providing system.

The user terminal 400, as shown in FIG. 8, has a structure including a RAM 411 for temporarily storing information; an information storage apparatus 412, such as a hard disk or a magneto-optical disk, capable of storing, at least information; a display circuit 413 for producing a display signal for displaying information read from the information storage apparatus 412; a display apparatus 414 for performing display in accordance with the display signal supplied from the display circuit 413; an operation unit 415, such as a keyboard or a mouse, for operating the user terminal 400: a decoding circuit 416 for decoding encoded information supplied from the information providing apparatus 200; an information medium reading unit 417 for reading an information record (recording, recordable or recorded) medium distributed from an information provider; a ROM 418 for storing identification (ID) number information specific to the information medium reading unit 417; a ROM 420 for storing a program for controlling the user terminal 400 and information about the structure of the user terminal 400; a CPU 419 for executing the control program; a communication line interface portion 421 for transmitting information to the communication network (communication line) 300; and a system bus 422 for the CPU 419 consisting of a data bus, an address bus, a control bus and the like.

Description will now be described about the operation of the information providing system consisting of the information providing apparatus 200, the communication network 300 and the user terminal 400 in a case where the communication network (communication line) 300 between the user side and the information provider side is a so-called ISDN (Integrated Service Digital Network) line.

Initially, the user obtains a large-capacity information storage medium 301 distributed gratuitously or onerously from the information provider. Note that the information storage medium 301 is a large-capacity information storage media, such as a CD-ROM, which is an optical record medium, the information storage medium 301 having encoded information in a large quantity recorded thereon. The information storage medium 301 may be a recordable medium, such as a write-once medium or a magneto-optical disk. The ROM 418 of the user terminal 400 has identification number (hereinafter called a "reading apparatus ID") specific to the information medium reading unit 417 recorded thereon. The information storage medium 301 stores ID (hereinafter called "medium ID") for identifying the medium and ID (hereinafter called "information ID") for identifying each of information items. The user has personal ID (hereinafter called "user ID") and a password.

A process for the user to read desired information from the information storage medium 301 to be performed under the foregoing conditions will now be described with reference to FIGS. 9 to 12.

Figure 9:
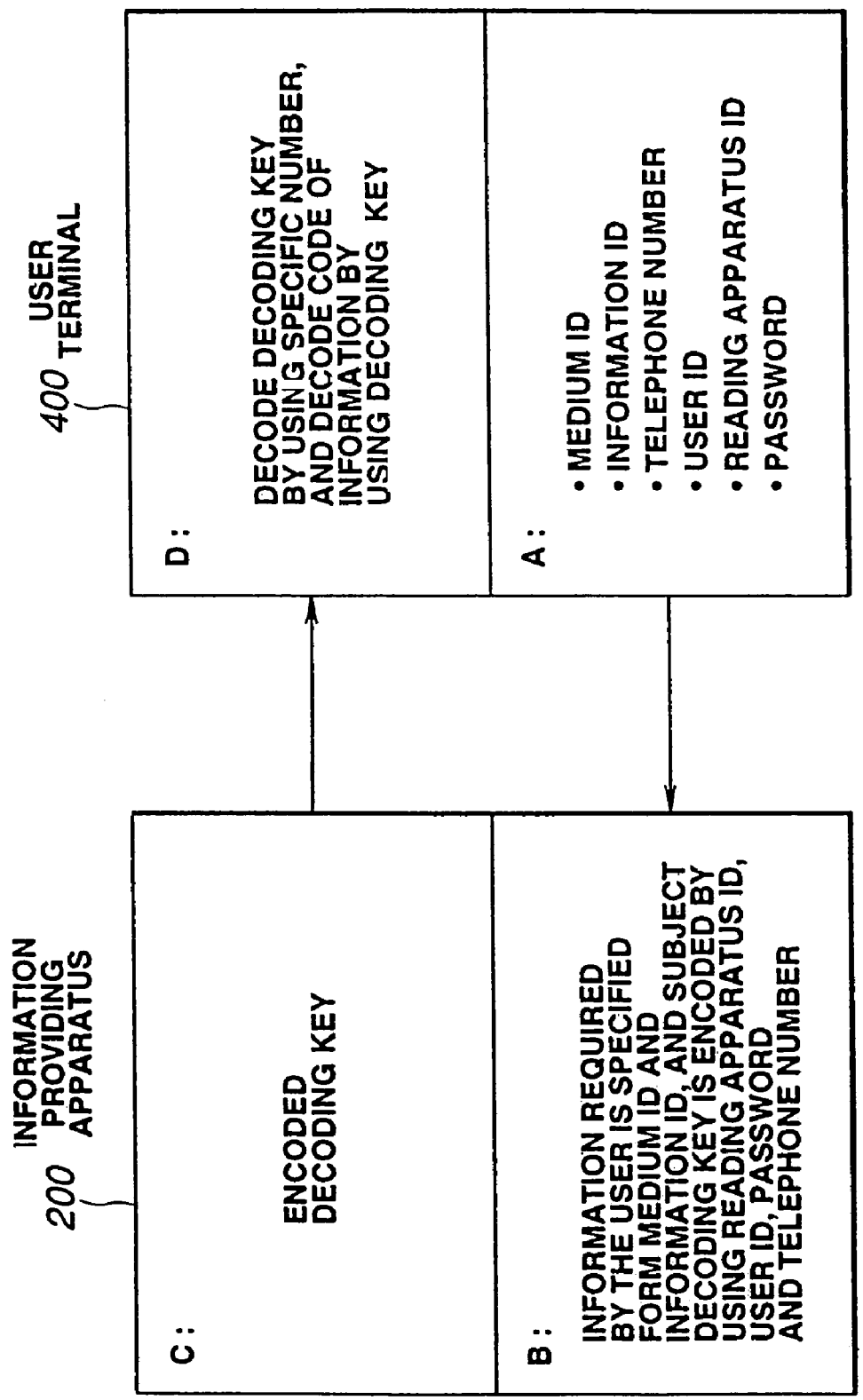
FIG. 9 is a view of explanatory of the operation in the information providing system and information to be transmitted.

Portion A of FIG. 9 has, recorded thereon, information to be transmitted from the user terminal 400 to the information providing apparatus 200. That is, information to be transmitted from the user terminal 400 is number information specific for the user, the number information consisting of, for example, telephone number, user ID, password, reading apparatus ID, medium ID required to specify information and information ID. The telephone number is telephone number of the user, the telephone number (the telephone number of the calling station) being, in the ISDN, automatically transmitted from the calling station to the called station.

Figure 10:
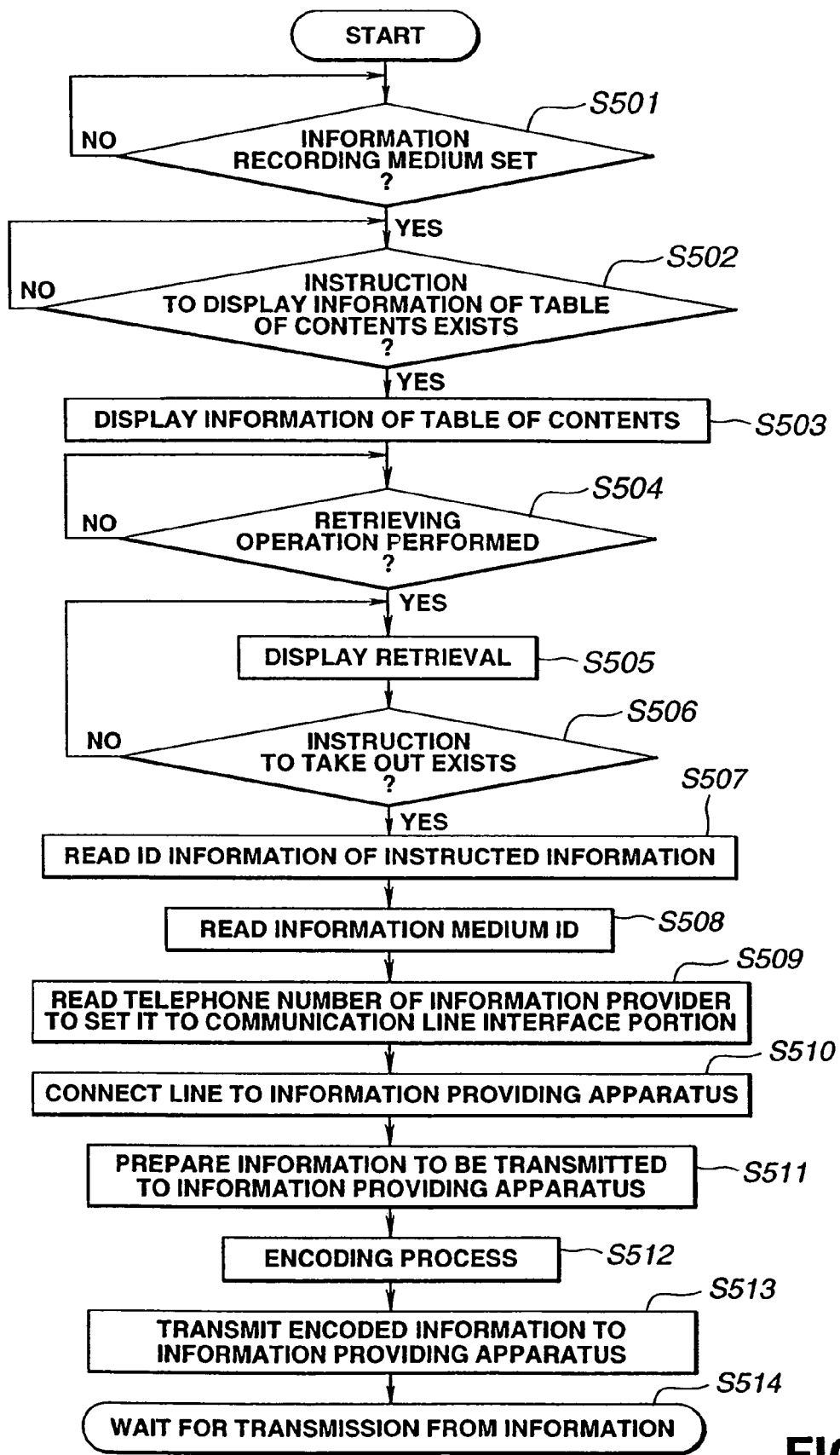
FIG. 10 is a flow chart of a process to be performed until encoded information is transmitted from the user terminal to the information providing apparatus.

Referring to FIG. 10, the operation of the user terminal 400 will now be described.

Referring to FIG. 10, the CPU 419 of the user terminal 400, in step S501, determines whether or not the information storage medium 301 has been set to the information medium reading unit 417 of the user terminal 400. If a determination has been performed in step S501 that the information storage medium 301 has not been set, the determination in step S501 is repeated. If a determination has been performed that the information storage medium 301 has been set, the operation proceeds to step S502. The information medium reading unit 417 for reading the information storage medium 301 has a structure such that the information storage medium 301 is detachable with respect to the information medium reading unit 417.

Then, the user operates the operation unit 415 of the user terminal 400 so as to perform an operation of retrieving desired information in the information storage medium 301. At this time, the CPU 419 determines whether or not an instruction to display table of contents has been issued from the operation unit 415. If a determination has been performed that the instruction has not been issued, the determination in step S502 is repeated. If determination has been performed that the instruction has been issued, the operation proceeds to step S503. In step S503 information about the table of contents is reproduced from the information storage medium 301 set to the information medium reading unit 417 of the user terminal 400 in accordance with the operation of the operation unit 415 performed by the user. The display circuit 413 produces a display signal based on the reproduced information about the table of contents, the display signal being supplied to the display apparatus 414 so that the information about the table of contents is displayed on the display screen. Note that information about the table of contents s a portion of information recorded on the information storage medium 301, the contents of which can be perused.

In step S504 the CPU 419 determines whether or not the retrieval operation has been performed by operating the operation unit 415 from information about the table of contents displayed on the display screen of the display apparatus 414. If a determination has been performed that the operation has not been performed, the determination in step S504 is repeated. If a determination has been performed that the operation has been performed, the operation proceeds to step S505. In step S505 the contents, which are being retrieved, are displayed. In step S506 a determination is performed whether or not an instruction to take out information has been issued with respect to any one of the contents displayed as the contents which are being retrieved from the user through the operation unit 415. If a determination has been performed in step S506 that the instruction to take out the information has not issued, the operation returns to step S505. If a determination has been performed that the instruction has been issued, the operation proceeds to step S507. In step S507 ID information of the instructed information is read. That is, in the retrieval operation to be performed in steps S504 to S507, if the user has detected a desired information, the user operates the operation unit 415 so that the instruction to take out the contents from the information storage medium 301 is issued. If the foregoing instruction has been supplied, the ID information of the instructed information is read from the corresponding information storage medium 301.

In step S508 the information medium ID is similarly read from the information storage medium 301, and then the operation proceeds to step S509.

In step S509 the CPU 419 performs an operation of calling the information provider. That is, the telephone number of the information provider, which has been previously stored, is read from the information storage apparatus 412 and the telephone number is set to the communication line interface portion 421. At this time, the communication line interface portion 421 performs a calling operation with respect to the information providing apparatus 200 of the information provider to connect the lines in step S510.

In step S511 the CPU 419 prepares information to be supplied to the information providing apparatus 200. Then, the operation proceeds to step S512. Information to be supplied to the information providing apparatus 200 is information medium ID, information ID, user ID, and information medium reading apparatus ID. In step S512 the CPU 419 encodes the information medium ID and information medium reading apparatus ID by using the user ID and password.

In step S513 encoded information is supplied to the information providing apparatus 200 of the information provider through the communication line interface portion 21. In step S514 transmission from the information providing apparatus 200 is waited for.

The process to be performed by the information provider will now be described. As described in portion B of FIG. 9, when a call is performed from the user terminal 400, the information providing apparatus 200 specifies information required for the user in accordance with the medium ID and the information ID to encode decoding key information by using the reading apparatus ID, the user ID, and the password so as to transmit the encoded decoding key information to the user terminal 400. It is possible to use the telephone number to encode decoding key information.

Figure 11:
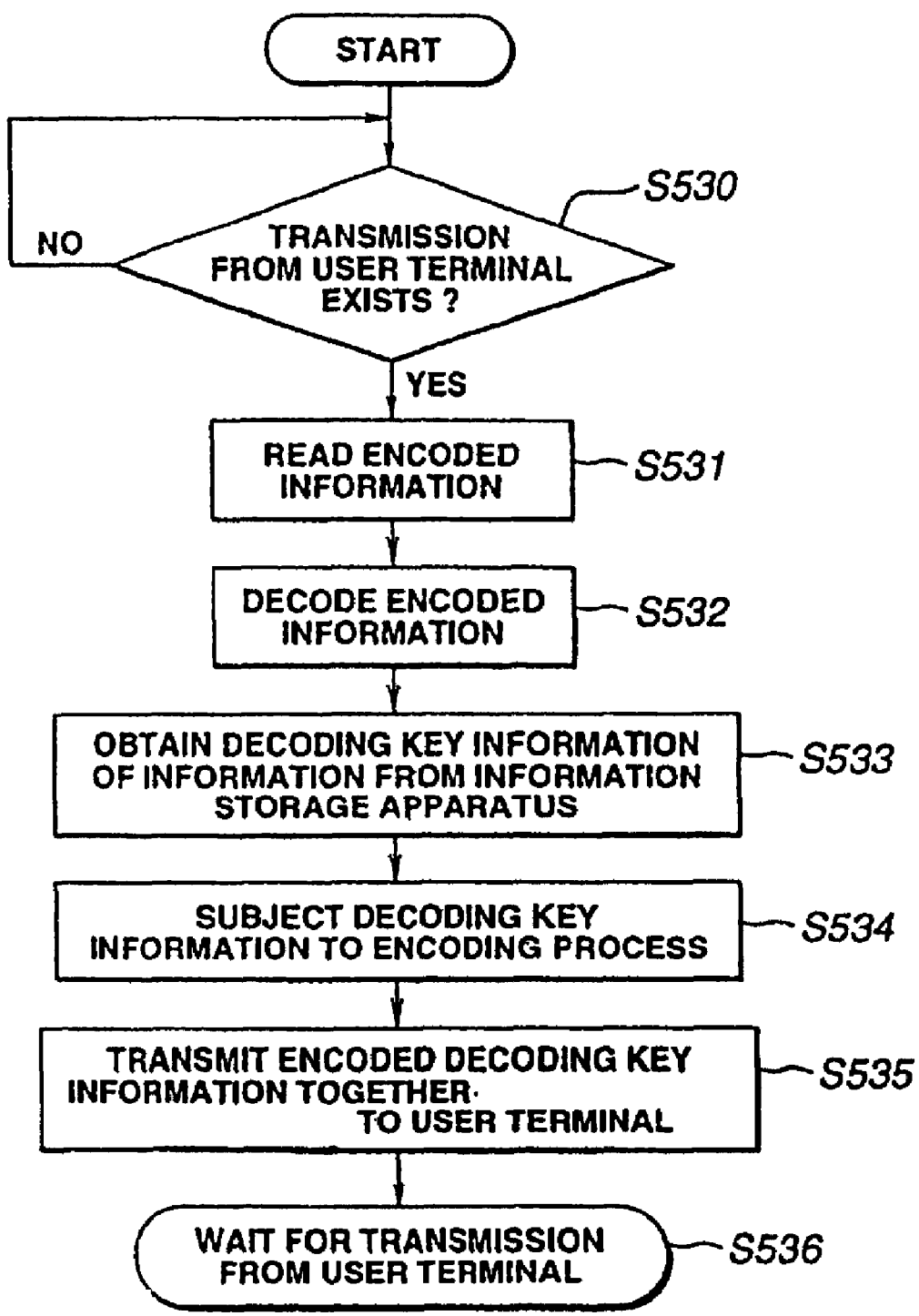
FIG. 11 is a flow chart of a process to be performed until encoded decoding key information is transmitted from the information providing apparatus to the user terminal.

The foregoing process will now be described with reference to FIG. 11. In step S530 the CPU 7 determines whether or not a transmission (a call) has been performed from the user terminal 400. If a determination has been performed that no transmission has been performed, a waiting state is realized so that the determination in step S530 is repeated. If a determination has been performed in step S530 that the transmission has been performed, the operation proceeds to step S531. In step S531 the CPU 207, through the communication line interface portion 206 and the converter 204, reads encoded information supplied from the user terminal 400 through the communication line.

In step S532 the CPU 207 reads the password included in the accounting information of the user stored in the information storage apparatus 202, reading being performed in accordance with the received user ID. Then, the CPU 207 combines the password with the user ID so as to decode the received information, which has been encoded. In step S533 the information medium ID and the information ID read as a result of decoding in step S532 are used to obtain decoding key information of the subject information from information medium control information stored in the information storage apparatus 201.

In step S534 the obtained decoding key information is, together with the user ID, the password and the reading apparatus ID, supplied to the encoding circuit 203 so as to be subjected to an encoding process. In step S535 the encoded information is supplied to the user terminal 400 through the converter 204 and the communication line interface portion 206. That is, as shown in portion C of FIG. 9, information to be transmitted from the information providing apparatus 200 to the user terminal 400 is encoded decoding key information.

Figure 12:
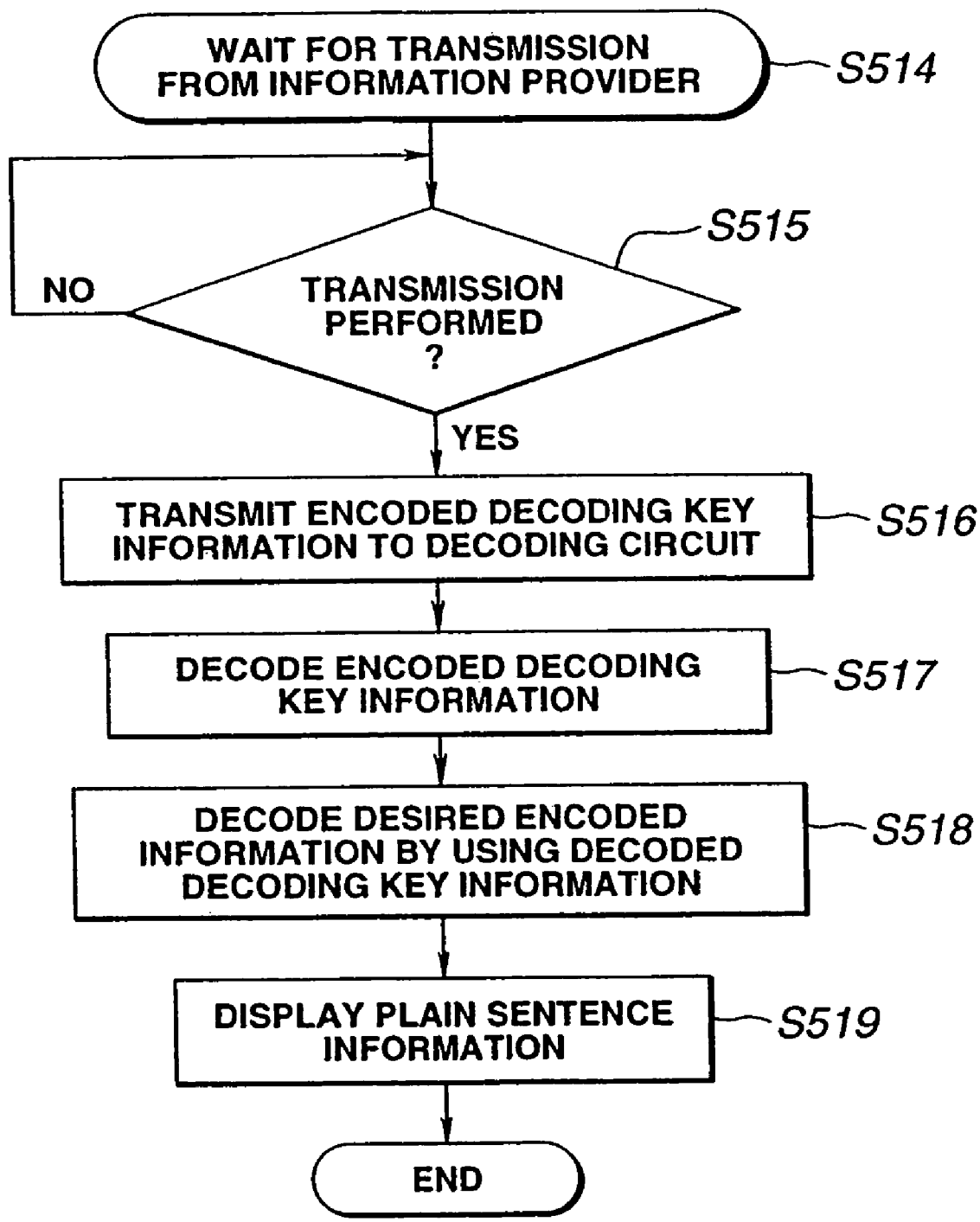
FIG. 12 is a flow chart of a process to be performed by the user terminal until encoded information of an information storage medium is decoded by using encoded decoding key information supplied from the information providing apparatus.

The user terminal 400, which has received the encoded decoding key information from the information providing apparatus 200, performs a process shown in. FIG. 12. That is, the user terminal 400, which has received the encoded decoding key information, uses the specific number that is, the user ID, the password and the reading apparatus ID, to decode the encoded decoding key information as shown in portion D of FIG. 9, and then uses the decoded decoding key information to decode encoded information on the information storage medium 301.

As shown in FIG. 12, the user terminal 400, in a state where transmission from the information providing apparatus 200 is waited for in step S514, determines whether or not transmission has been performed from the information providing apparatus 200 in step S515. If the transmission has not been performed, the foregoing determination is repeated. If the transmission has been performed, the process in step S516 is performed.

In step S516 the CPU 419 transmits the encoded decoding key information received through the communication line interface portion 421 to the decoding circuit 416.

The decoding circuit 416, in step S517, receives from the ROM 418 the user ID, the password and the reading apparatus ID, which is the specific number of the information medium reading unit 417, and uses the supplied information to decode the received decoding key information.

In step S518 the CPU 419 uses the decoding key information, which has been decoded by the decoding circuit 416, to cause required and encoded information recorded on the information storage medium 301 to transmit the information to the decoding circuit 416. The decoding circuit 416 decodes the required and encoded information by using the decoding key information to obtain information in the form of a plain sentence that can be used by the user.

In step S519 the information in the form of the plain sentence is supplied to the display circuit 413. A display signal of the information in the form of the plain sentence produced in the display circuit 413 is supplied to the display apparatus 414. As a result, information in the form of the plain sentence, which can be read by the user, is displayed on the display screen of the display apparatus 414.

The foregoing description has been performed about a process to be performed until the information in the form of the plain sentence is displayed on the display screen of the display apparatus 414. In a case where the information in the form of the plain sentence is copied on the information storage apparatus 412, the information in the form of the plain sentence is not as it is copied on the information storage apparatus 412. As an alternative to this, the CPU 419 uses the information medium reading apparatus ID and the user ID to encode the information in the form of the plain sentence so as to be stored and recorded. When information stored in the information storage apparatus 412 is read, the encoded information is supplied from the information storage apparatus 412 to the decoding circuit 416 so that information is decoded in accordance with the information medium reading apparatus ID and the user ID.

Although this embodiment has been described which includes the ISDN line serving as the information transmission means for establishing the connection between the information providing apparatus 200 of the information provider and the user terminal 400, the structure of the present invention can, of course, be realized in a case where a usual analog telephone line, a CATV (Cable Television) line, a wireless communication line or a LAN (Local Area Network) is used. Moreover, the present invention can be applied to a system in which information is supplied and received by mail or the express delivery.

Although the user ID and the password are used as the personal identification information of a user, the personal identification information of a user may be the machine number of the user terminal 400, the telephone number of the user, a password determined by the user or the physical address of the network interface. In the case where the machine number of the user terminal 400 is used as the personal identification information, a structure may be constituted such that machine number information is directly supplied to the decoding circuit 416.

As described above, with the information providing system according to the present invention, in a case where a system has been constituted such that a medium in which a large quantity of information has been recorded on an information record medium is distributed to users and decoding key information for decoding code of desired information is transmitted through a communication line or a network, decoding key information encoded with a specific number (ID) is transmitted from the information provider to the reading apparatus. Therefore, even if the decoding key information is intercepted from the line or the network, the interceptor cannot obtain correct decoding key information. Therefore, the security performance can be improved.

The structure such that ID information, such as the ID of an information reading apparatus, specific to a user is encoded and transmitted to the information providing apparatus, the information providing apparatus encodes the decoding key information in accordance with the supplied encoded ID information followed by transmitting the encoded decoding key information to the user's terminal further improves the security.

When information is copied from an information medium reading apparatus on another information storage apparatus, information is always encoded by using the ID of the reading apparatus and then the information is written. Therefore, unlawful copying can be prevented. When the ID of the reading apparatus is formed into a structure which cannot be handled or read from the user, the security performance can further be improved. That is, in the case where information read from the information storage medium is copied on the user terminal side, information, the code of which has been temporarily decoded, can be copied as it is. In the structure according to the embodiment of the present invention, decoded information is again encoded with a plurality of specific information items of ID information of the information reading apparatus so that the security performance is further improved.

As disclosed in the electronic data protective method filed in U.S. Pat. No. 5,392,351, there is available a structure in which encoded electronic data is, together with a specific medium number of the medium, previously written on an information medium; the permission side generates a specific medium key in accordance with the specific medium number; the decoding key for encoded electronic data is encoded by using the specific medium key; encoded data is, as permission information, written on the medium; the user side generates specific medium key in accordance with the specific medium number read from the medium; permission information read from the medium is decoded by the foregoing specific medium key to generate the original key for decoding electronic data; and encoded electronic data read from the medium is decoded by the key for decoding electronic data so as to generate plain sentence electronic data. However, the foregoing technique having the structure such that the key for decoding electronic data is generated on condition of specific ID (for example, serial numbers specific to the mediums) for each information medium has a difficulty in recording specific ID information for each of mediums, for example, CD-ROMs, which are mass-produced. On the other hand, the information providing system according to the present invention does not require the medium ID for the information storage medium to be a specific ID for each medium. Since information recorded on the medium can be made to be information subjected to the same encoding process for the mediums, large-quantity copying is enabled. Therefore, the information providing system according to the present invention can be adapted to a medium, such as the CD-ROM. The foregoing electronic data protective method has the structure such that the permission side encodes the key for decoding electronic data; the encoded key for decoding electronic data is written on the medium as permission information; and then use by the user is permitted. Therefore, the foregoing electronic data protective method is not suitable to the mediums, such as CD-ROMs, which are mass-produced. On the other hand, the present invention has the structure such that decoding key information is transmitted such that the ID specific for the user, such as the information reading apparatus ID, is transmitted to the information provision side through a communication line; and the information provision side encodes the decoding key information in accordance with the supplied ID and returns the encoded decoding key information. Therefore, the present invention can effectively be adapted to mediums which are mass-produced. Because of the foregoing facts, the present invention enables the necessity of recording specific information when the information record mediums are manufactured to be eliminated. Therefore, the manufacturing cost can be reduced and, therefore, low-cost information record mediums can be provided.

Since the present invention has the structure such that identification information specific for the data recording apparatus is recorded on the record medium, confirmation of identification information enables the process hysteresis of the record medium to be detected. Thus, easy copying can be prevented. If identification information does not exist, reproduction of data from the record medium is interrupted. Thus, copying of data from the record medium can be prevented.

In the present invention, an information medium having information encoded on an information collection side is distributed from an information providing side; the information providing side and the information collection side are connected to each other through information transmission means; information is transmitted and received between the information providing side and the information collection side through the information transmission means; the information providing side uses at least one specific information of the information collection side to encode key information required to decode encoded information of the information medium; the information collection side uses encoded key information transmitted from the information providing side to decode the key information; and the information collection side uses encoded information read from the information medium to decode the encoded information by using the decoded key information. Thus, transmission security of key information from the information providing side to the information collection side can be improved. Moreover, the information collection side can reliably be performed.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An information collecting apparatus comprising:
   transmitting and receiving means for transmitting and receiving information to and from an information providing side through information transmitting means;
   information medium reading means for reading information from a non-unique information medium having encoded information recorded thereon;
   information encoding means for encoding a medium ID and an information reading means ID by using a user ID and a user password to produce encoded user information and for supplying said encoded user information to said information providing side;
   encoded-key decoding means for receiving encoded key information unique to said information reading means ID, user ID and user password and electronically transmitted from said information providing side and for using said information reading means ID, said user ID and said user password to decode the key information encoded at said information providing side;
   encoded-information decoding means for decoding said encoded information read from said information medium by using said decoded key information;
   determining means for determining whether a retrieval operation has been performed; and
   display means for displaying retrieved content when the determining means determines that a retrieval operation has been performed.

* * * * *